(12) United States Patent
Lin et al.

(10) Patent No.: US 11,910,791 B2
(45) Date of Patent: Feb. 27, 2024

(54) GRADED EARLY WARNING SYSTEM FOR PEST QUANTITY COUNTING

(71) Applicant: National Taiwan University, Taipei (TW)

(72) Inventors: Ta-Te Lin, Taipei (TW); Dan Jeric Arcega Rustia, Taipei (TW); Lin-Ya Chiu, Taipei (TW)

(73) Assignee: National Taiwan University, Taipei (TW)

( * ) Notice: Subject to any disclaimer, the term of this patent is extended or adjusted under 35 U.S.C. 154(b) by 128 days.

(21) Appl. No.: 17/211,826

(22) Filed: Mar. 25, 2021

(65) Prior Publication Data

US 2022/0279773 A1 Sep. 8, 2022

(30) Foreign Application Priority Data

Mar. 2, 2021 (TW) ................................. 110107327

(51) Int. Cl.
*A01M 1/02* (2006.01)
*G08B 5/22* (2006.01)
(Continued)

(52) U.S. Cl.
CPC ........... *A01M 1/026* (2013.01); *G06F 18/214* (2023.01); *G06F 18/2415* (2023.01); *G06T 11/001* (2013.01); *G06V 20/53* (2022.01); *G08B 5/22* (2013.01); *H04N 7/183* (2013.01); *G06T 2200/24* (2013.01); *H04L 67/10* (2013.01); *H04W 88/02* (2013.01)

(58) Field of Classification Search
CPC ... A01M 1/026; G06K 9/6256; G06K 9/6277; G06T 11/001; G06T 2200/24; G06V 20/53; G08B 5/22; H04N 7/183; H04L 67/10; H04W 88/02
See application file for complete search history.

(56) References Cited

U.S. PATENT DOCUMENTS

2019/0223431 A1* 7/2019 Rustia .................. A01M 1/026
2020/0364843 A1* 11/2020 Stueve .................. A01G 25/16
(Continued)

FOREIGN PATENT DOCUMENTS

| CN | 111914951 A | 11/2020 |
|---|---|---|
| CN | 112215170 A | 1/2021 |
| TW | M597472 U | 6/2020 |

*Primary Examiner* — Said Broome
*Assistant Examiner* — Andrew Shin

(57) ABSTRACT

A graded early warning system for pest quantity counting includes: at least one image capturing device used to capture images of at least one pest trapping device in an environment to generate at least one pest trapping image; at least one environment monitoring and sensing device used to detect the environment to generate at least one environment parameter; at least one pest detecting and identifying device used to detect quantities and species of multiple pests based on the at least one pest trapping image; and a cloud server used to receive the at least one pest trapping image, the at least one environment parameter, and the quantities and species of multiple pests; wherein the cloud server immediately establishes pest probability models, generates early warning signals, and prompts suppression decisions according to the at least one environment parameter and the quantities and species of multiple pests.

6 Claims, 4 Drawing Sheets

(51) Int. Cl.
*G06T 11/00* (2006.01)
*H04N 7/18* (2006.01)
*G06V 20/52* (2022.01)
*G06F 18/214* (2023.01)
*G06F 18/2415* (2023.01)
*H04L 67/10* (2022.01)
*H04W 88/02* (2009.01)

(56) References Cited

U.S. PATENT DOCUMENTS

2021/0056298 A1\* 2/2021 Vickery ................. G06V 20/52
2021/0279639 A1\* 9/2021 Singh ................ H04M 1/72403

\* cited by examiner

GRADED EARLY WARNING SYSTEM FOR PEST QUANTITY COUNTING

CROSS-REFERENCE TO RELATED APPLICATIONS

This application claims the benefit of priority from the prior Taiwanese Patent Application No. 110107327, filed Mar. 2, 2021, the entire contents of which are incorporated herein by reference.

FIELD OF THE INVENTION

The present invention relates to a graded early warning system, and more particularly to a graded early warning system for pest quantity counting.

BACKGROUND OF THE INVENTION

There are many methods for calculating the number of pests on the sticky insect paper, but so far, there is no standard automatic method for graded early warning of the number of pests, and there is no probability model that can clearly describe the flight behavior and outbreak of pests in each place. It does not help users plan appropriate pest control policies and provide suitable pesticide types timely. Therefore, it is necessary to develop a system that can provide graded early warning of pests, establish pest probability models, and provide appropriate pest control policies.

SUMMARY OF THE INVENTION

In order to describe the flight behavior of pests and the possibility of outbreaks in each place, a graded early warning system for pest quantity counting of the present invention can build a probability model for a specific location, and provide a graded early warning and a pest probability model for pest quantity to help farmers determine pest control decisions for assisting to plan a more appropriate strategy for pest control.

The graded early warning system for pest quantity counting provided by the present invention includes at least one image capturing device, at least one environment monitoring and sensing device, at least one pest detecting and identifying device, and a cloud server. The at least one image capturing device is used to capture images of at least one pest trapping device in an environment to generate at least one pest trapping image. The at least one environment monitoring and sensing device is used to detect the environment to generate at least one environment parameter. The at least one pest detecting and identifying device is used to detect quantities and species of multiple pests based on the at least one pest trapping image. The cloud server is connected to the at least one image capturing device, the at least one environment monitoring and sensing device, and the at least one pest detecting and identifying device, and used to receive the at least one pest trapping image, the at least one environment parameter, and the quantities and species of multiple pests. And the cloud server immediately establishes pest probability models for the multiple pests, generates early warning signals for the multiple pests, and prompts suppression decisions for the multiple pests according to the at least one environment parameter and the quantities and species of multiple pests.

In an embodiment of the present invention, the graded early warning system for pest quantity counting further includes an electronic device which is connected to the cloud server and used to immediately display the pest probability models, the early warning signals, and the suppression decisions for the multiple pests.

In an embodiment of the present invention, the electronic device is a mobile device used to receive and display the pest probability models, the early warning signals, and the suppression decisions for the multiple pests.

In an embodiment of the present invention, the cloud server includes a database used to store historical pest trapping images, historical environment parameters, historical quantities and species of multiple pests, and historical pest probability models.

In an embodiment of the present invention, the cloud server includes a processor used to establish the pest probability models for the multiple pests, generate the early warning signals for the multiple pests, and prompt the suppression decisions for the multiple pests, and generate relationships between the at least one environment parameter, the pest probability models for the multiple pests, the early warning signals for the multiple pests, and the suppression decisions for the multiple pests.

In an embodiment of the present invention, the at least one pest detection and identification device uses a deep learning to perform artificial intelligence image identification of the quantities and species of the multiple pests.

In an embodiment of the present invention, the early warning signals are prompted at different levels which are distinguished by different colors.

In an embodiment of the present invention, the suppression decisions prompt control methods and pesticide types based on the quantities and species of the multiple pests and the early warning signals for the multiple pests.

The present invention can immediately establish pest probability models for multiple pests, generate early warning signals for multiple pests, and prompt suppression decisions for the multiple pests, so as to help farmers determine pest control decisions for assisting to plan a more appropriate strategy for pest control.

In order to make the above and other objects, features, and advantages of the present invention more comprehensible, embodiments are described below in detail with reference to the accompanying drawings, as follows.

DETAILED DESCRIPTION OF PREFERRED EMBODIMENTS

Hereinafter, the present invention will be described in detail with drawings illustrating various embodiments of the present invention. However, the concept of the present invention may be embodied in many different forms and should not be construed as limitative of the exemplary embodiments set forth herein. In addition, the same reference number in the figures can be used to represent the similar elements.

Figure 1:
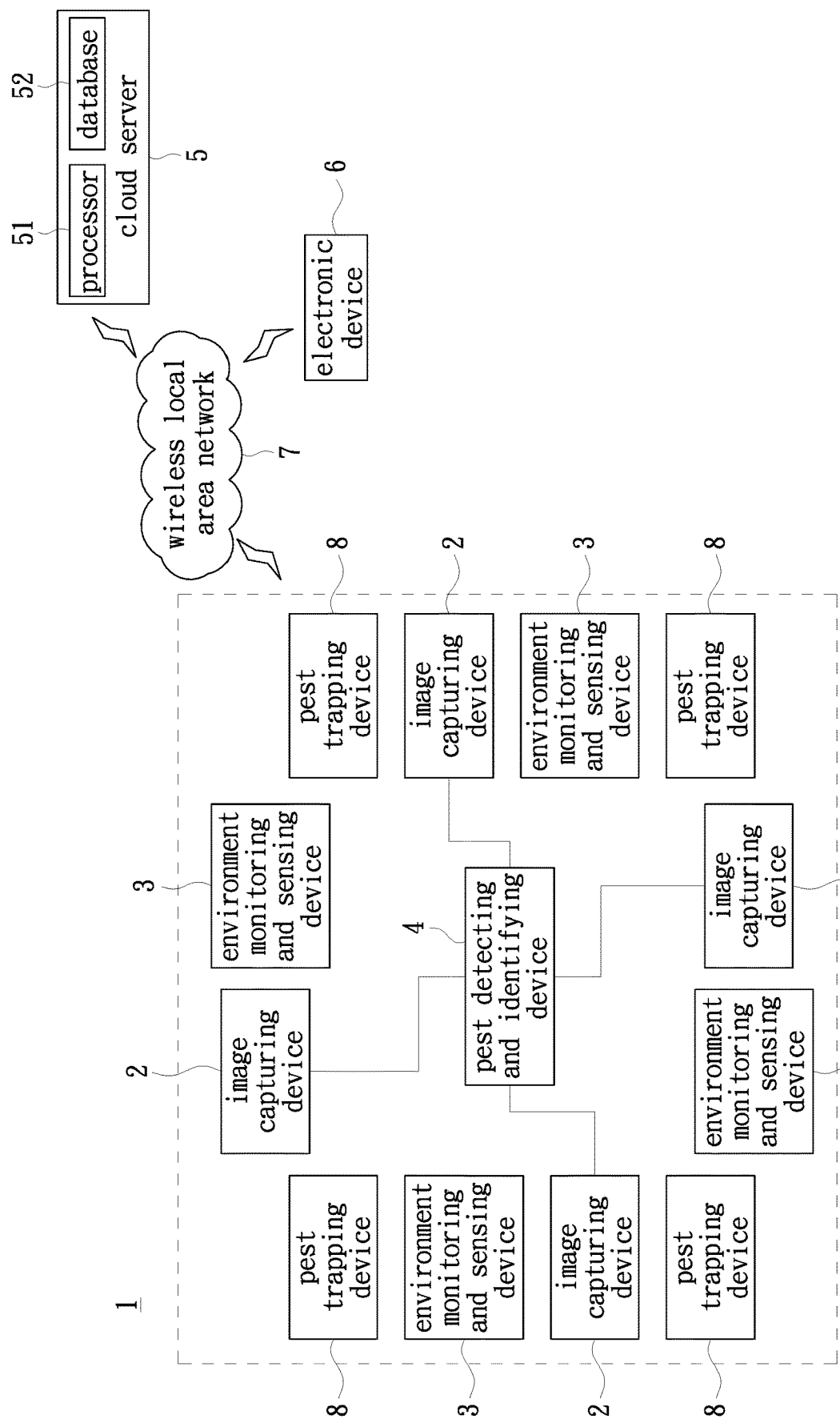
FIG. 1 is a block diagram of a graded early warning system for pest quantity counting provided by an embodiment of the present invention.

Please refer to FIG. 1, the graded early warning system 1 for pest quantity counting provided by the present invention includes at least one image capturing device 2, at least one environment monitoring and sensing device 3, at least one pest detecting and identifying device 4, a cloud server 5, an electronic device 6, and at least one pest trapping device 8. The cloud server 5 is connected to the at least one image capturing device 2, the at least one environment monitoring and sensing device 3, and the at least one pest detecting and identifying device 4. The connection technology can be wireless transmission/connection technology such as wireless local area network 7 technology and Internet of Things technology. The electronic device 6 is connected to the cloud server 5, and the connection technology can be wireless transmission/connection technology such as wireless local area network 7 technology, wireless communication technology, etc. It is noted that the connection method is not intended to limit the present invention. Those skilled in the art should be able to select different wireless transmission/connection technologies according to actual needs or applications. In addition, the number of the image capturing device 2, the environment monitoring and sensing device 3, the pest detecting and identifying device 4, and the pest trapping device 8 in FIG. 1 is only an example and is not intended to limit the present invention. Those skilled in the art should be able to select an appropriate number according to a size of an environment or actual needs to establish a graded early warning system 1 for pest quantity counting.

In the embodiment, the at least one environment monitoring and sensing device 3 is used to detect the environment to generate at least one environment parameter, wherein the environment can be a greenhouse or a specific/restricted area, and the environment monitoring and sensing device 3 can include sensors for sensing environment parameters, such as a temperature sensor, a humidity sensor, and an illuminance sensor.

In the embodiment, the at least one image capturing device 2 is used to capture images of at least one pest trapping device 8 in the environment to generate at least one pest trapping image, wherein the at least one pest trapping device 8 can be sticky papers with different colors to attract different pests. In detail, the image capturing device 2 may be a camera, which is used to record or monitor different pests attached to the pest trapping device 8 to generate pest trapping images. In addition, the pest trapping device 8 being the sticky paper is only an example, and is not intended to limit the present invention.

In the embodiment, the at least one pest detecting and identifying device 4 is used to detect quantities and species of multiple pests based on the at least one pest trapping image, wherein the pest detecting and identifying device 4 uses a deep learning to perform artificial intelligence image identification of the quantities and species of the multiple pests. Since the appearance of various pests such as whiteflies, thrips, gnats, flies and other pests is not the same, the pest detecting and identifying device 4 uses deep learning to perform pest image recognition, thereby identifying different pests and their numbers.

In the embodiment, the cloud server 5 is used to receive the at least one pest trapping image, the at least one environment parameter, and the quantities and species of multiple pests, and immediately establishes pest probability models for the multiple pests, generates early warning signals for the multiple pests, and prompts suppression decisions for the multiple pests according to the at least one environment parameter and the quantities and species of multiple pests. In details, the cloud server 5 includes a processor 51 and a database 52 connected to the processor 51, wherein the database 52 is used to store historical pest trapping images, historical environment parameters, historical quantities and species of multiple pests, and historical pest probability models in the environment, and the processor 51 is used to immediately establish the pest probability models for the multiple pests, generate the early warning signals for the multiple pests, and prompt the suppression decisions for the multiple pests according to the received at least one environment parameter and the received quantities and species of multiple pests, and generate relationships between the at least one environment parameter, the pest probability models for the multiple pests, the early warning signals for the multiple pests, and the suppression decisions for the multiple pests. In addition, the processor 51 will also generate a webpage (not drawn) to display the pest probability models of the multiple pests, the early warning signals of the multiple pests, and the suppression decisions of the multiple pests, and their relationships with each other, so that farmers can watch the webpage to help farmers make decisions about pest control, and help farmers plan more appropriate strategies for pest control. The early warning signals can be prompted at different levels which are distinguished by different colors. For example, red is the highest warning level, and yellow is the medium warning level, and green is the lowest warning level, and the suppression decisions can prompt control methods and pesticide types based on the quantities and species of the multiple pests and the early warning signals for the multiple pests.

Figure 2:
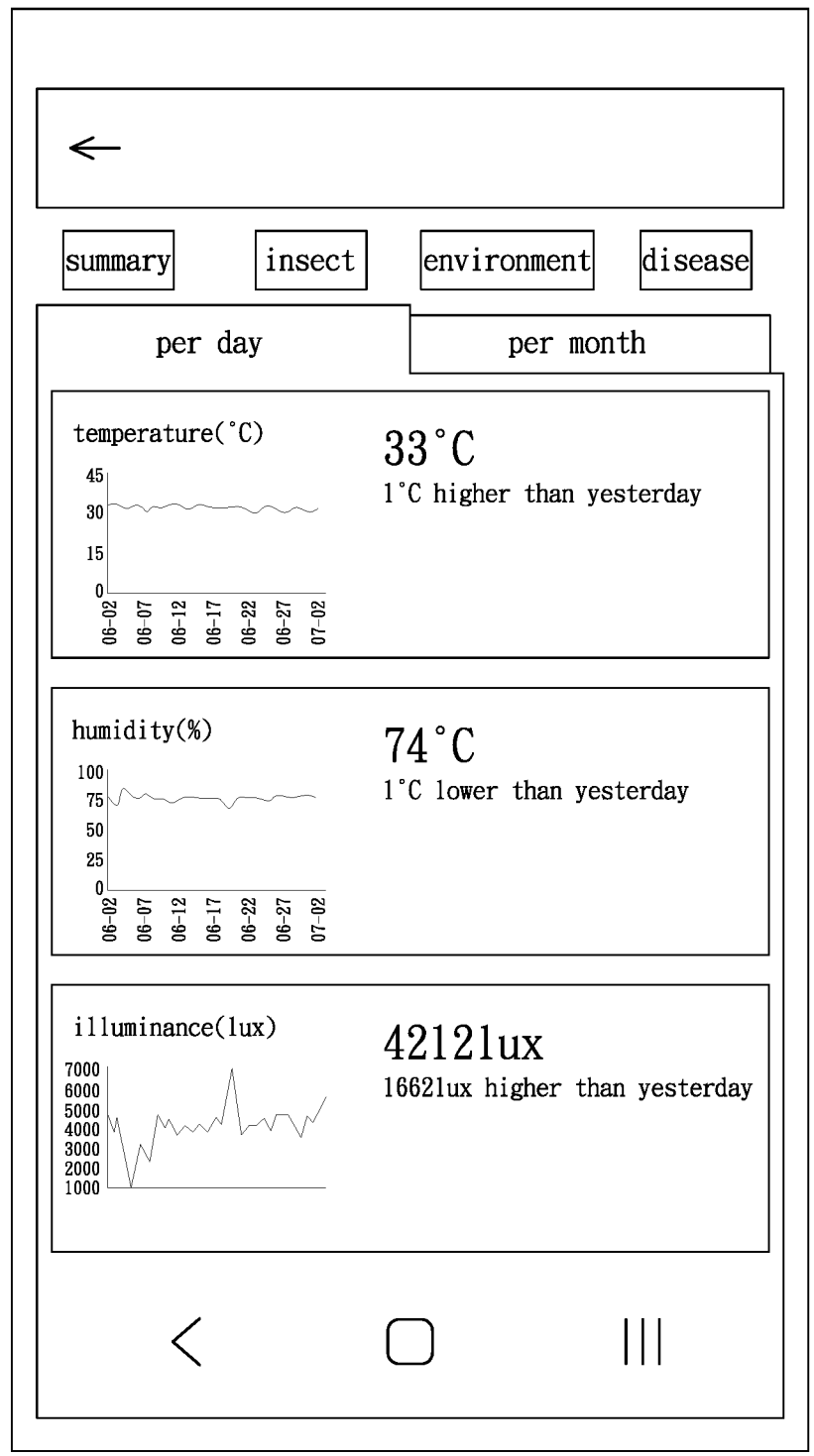
FIG. 2 is a schematic diagram of immediately displaying environment parameters via an electronic device provided by an embodiment of the present invention.
Figure 3:
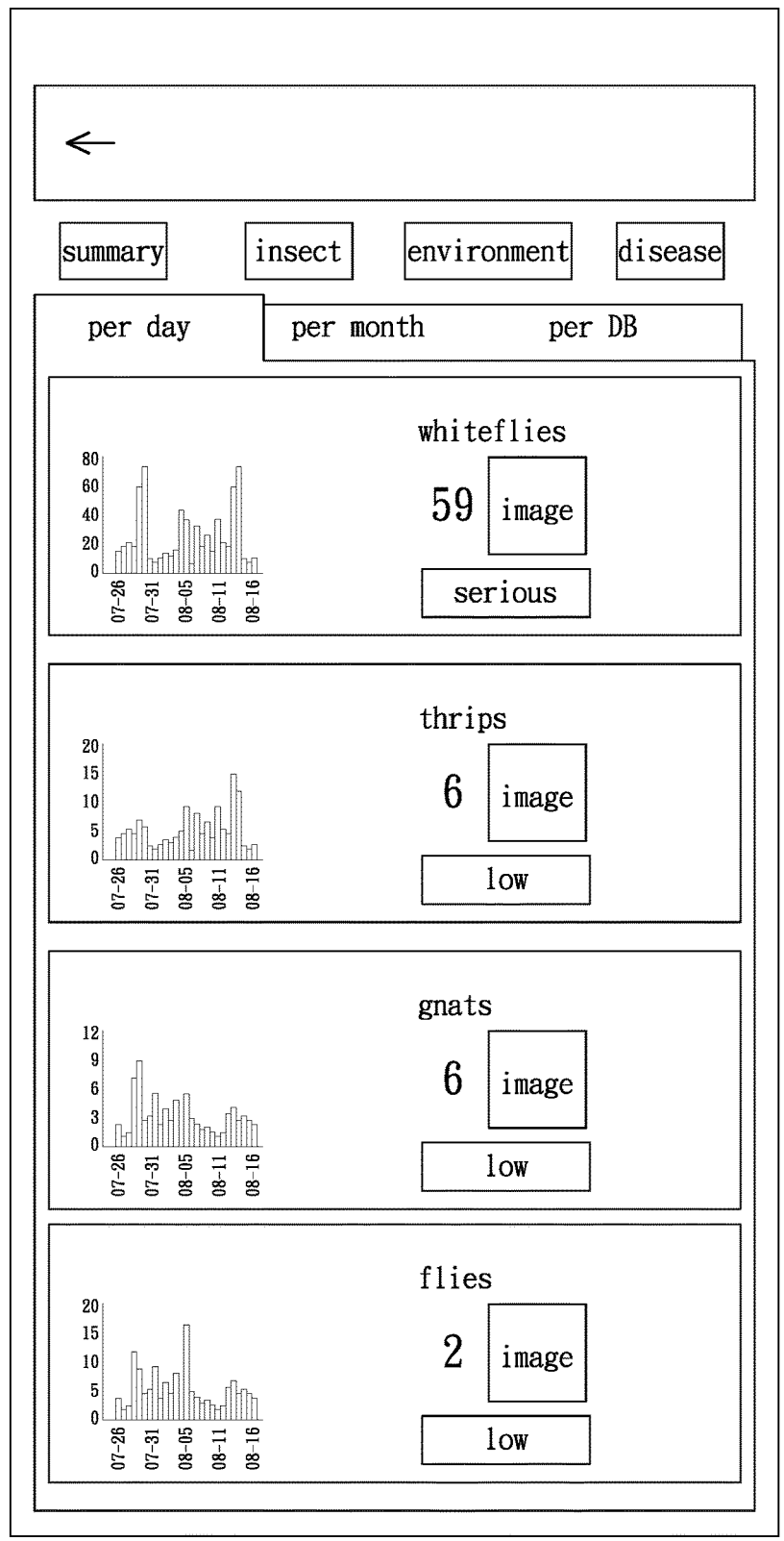
FIG. 3 is a schematic diagram of immediately displaying pest probability models and early warning signals for multiple pests via an electronic device provided by an embodiment of the present invention.
Figure 4:
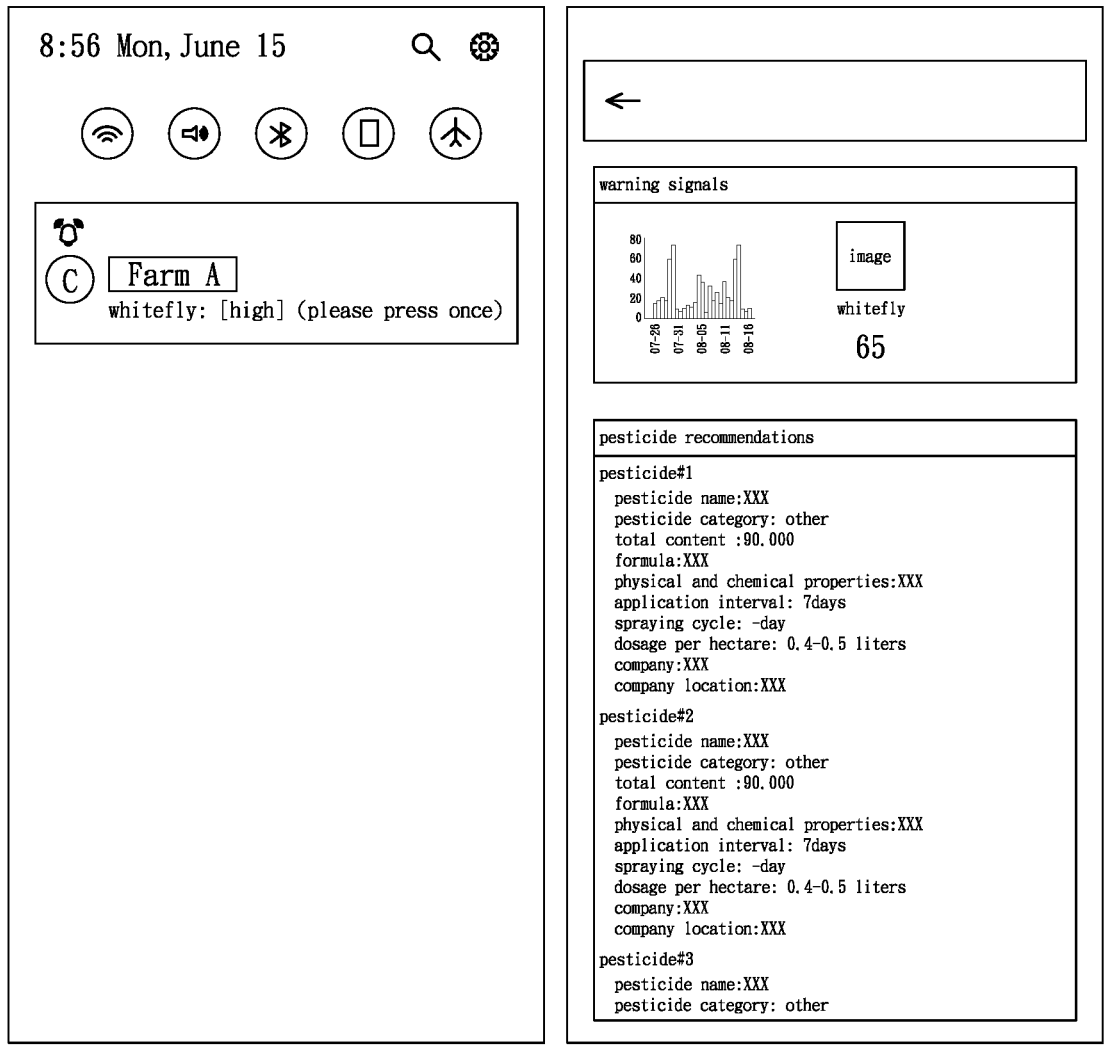
FIG. 4 is a schematic diagram of immediately displaying suppression decisions for multiple pests via an electronic device provided by an embodiment of the present invention.

In the embodiment, the electronic device 6 is used to immediately display the pest probability models, the early warning signals, and the suppression decisions for the multiple pests. As shown in FIGS. 2, 3, 4, the electronic device 6 is a mobile device used to receive and display the environment parameters of the environment, the pest probability models for the multiple pests, the early warning signals for the multiple pests, and the suppression decisions for the multiple pests via an application program, thereby helping farmers to hold the mobile device to remotely determine pest control decisions in real time, so as to farmers plan more appropriate strategies for pest control.

In summary, the present invention can automatically sense the environmental parameters of the environment for a specific location, and automatically count the quantities and species of pests to establish pest probability models, and prompt appropriate early warning signals, control methods, and pesticide types according to the quantities and species of pests. It can help farmers to remotely make decisions about pest control in real time, so as to help farmers plan more appropriate strategies for pest control.

Although the present invention has been disclosed as above with the embodiments, it is not intended to limit the present invention. Those ordinarily skilled in the art may make some modifications and retouching without departing from the spirit and scope of the present invention. Therefore, the protection scope of the present invention shall be determined by the scope of the attached claims.

What is claimed is:

1. A graded early warning system for insect pest quantity counting, comprising:
    at least one image capturing device, used to capture images of at least one sticky paper for trapping insect pests in a greenhouse environment to generate at least one insect pest trapping image;

at least one environment monitoring and sensing device, used to detect the environment to generate at least one environment parameter;

at least one insect pest detecting and identifying device, used to detect quantities and species of multiple insect pests based on the at least one insect pest trapping image;

a cloud server, connected to the at least one image capturing device, the at least one environment monitoring and sensing device, and the at least one insect pest detecting and identifying device, and used to receive the at least one insect pest trapping image, the at least one environment parameter, and the quantities and species of multiple insect pests;

wherein the cloud server immediately establishes insect pest probability models for the multiple insect pests, generates early warning signals for the multiple insect pests, and prompts suppression decisions for the multiple insect pests according to the at least one environment parameter and the quantities and species of multiple insect pests; and the at least one insect pest detection and identification device performs deep learning-based artificial intelligence image identification upon the quantities and species of the multiple insect pests;

wherein the early warning signals are prompted at different levels which are distinguished by different colors;

wherein a processor in the cloud server generates a webpage to display the insect pest probability models of the multiple insect pests according to the different colors, in order to prompt control methods and insect pesticide types based upon the quantities and species of the multiple insect pests.

2. The graded early warning system for insect pest quantity counting as claimed in claim 1, wherein the cloud server includes a database used to store historical insect pest trapping images, historical environment parameters, historical quantities and species of multiple insect pests, and historical insect pest probability models.

3. The graded early warning system for insect pest quantity counting as claimed in claim 1, wherein the cloud server includes a processor used to establish the insect pest probability models for the multiple insect pests, generate the early warning signals for the multiple insect pests, and prompt the suppression decisions for the multiple insect pests, and generate relationships between the at least one environment parameter, the insect pest probability models for the multiple insect pests, the early warning signals for the multiple insect pests, and the suppression decisions for the multiple insect pests.

4. The graded early warning system for insect pest quantity counting as claimed in claim 1, wherein the suppression decisions prompt control methods and insect pesticide types based on the quantities and species of the multiple insect pests and the early warning signals for the multiple insect pests.

5. The graded early warning system for insect pest quantity counting as claimed in claim 1, further comprising:

an electronic device, connected to the cloud server and used to immediately display the insect pest probability models, the early warning signals, and the suppression decisions for the multiple insect pests.

6. The graded early warning system for insect pest quantity counting as claimed in claim 5, wherein the electronic device is a mobile device used to receive and display the insect pest probability models, the early warning signals, and the suppression decisions for the multiple insect pests.

* * * * *